United States Patent [19]

Seymour

[11] 4,233,049
[45] Nov. 11, 1980

[54] METHOD AND APPARATUS FOR SHAPING GLASS SHEETS BY DROP FORMING

[75] Inventor: Samuel L. Seymour, Oakmont, Pa.

[73] Assignee: PPG Industries, Inc., Pittsburgh, Pa.

[21] Appl. No.: 44,425

[22] Filed: Jun. 1, 1979

Related U.S. Application Data

[63] Continuation-in-part of Ser. No. 960,404, Nov. 13, 1978, abandoned.

[51] Int. Cl.³ .............................................. C03B 23/02
[52] U.S. Cl. ........................................ 65/106; 65/104; 65/107; 65/268; 65/273; 65/25.4
[58] Field of Search ................. 65/104, 106, 107, 268, 65/273, 275, 25 A

[56] References Cited

U.S. PATENT DOCUMENTS

| 3,148,968 | 9/1964 | Cypher et al. | 65/106 |
|---|---|---|---|
| 3,223,501 | 12/1965 | Fredley et al. | 65/25 A |
| 3,332,759 | 7/1967 | McMaster et al. | 65/25 A |
| 3,476,540 | 11/1969 | Ritter et al. | 65/107 |
| 3,507,639 | 4/1970 | Seymour | 65/104 |
| 3,573,889 | 4/1971 | McMaster et al. | 65/62 |
| 3,600,150 | 8/1971 | Rougeux | 65/268 |
| 3,607,187 | 9/1971 | McMaster | 65/106 |
| 3,676,098 | 7/1972 | Hall | 65/106 |
| 3,690,856 | 9/1972 | Bryan | 65/287 |
| 3,701,643 | 10/1972 | Frank | 65/62 |
| 3,713,799 | 1/1973 | McMaster | 65/273 |
| 3,846,104 | 11/1974 | Seymour | 65/104 |
| 3,869,271 | 7/1973 | Shaffer et al. | 65/273 |
| 3,973,943 | 8/1976 | Seymour | 65/348 |
| 4,092,141 | 5/1978 | Frank et al. | 65/114 |

Primary Examiner—Arthur D. Kellogg
Attorney, Agent, or Firm—Dennis G. Millman

[57] ABSTRACT

Heat-softened glass sheets are held by a flat vacuum platen and dropped onto a shaping mold to impart the desired curvature to the glass sheet.

25 Claims, 12 Drawing Figures

METHOD AND APPARATUS FOR SHAPING GLASS SHEETS BY DROP FORMING

CROSS-REFERENCE TO RELATED APPLICATION

This application is a continuation-in-part of U.S. application Ser. No. 960,404, filed on Nov. 13, 1978 now abandoned.

BACKGROUND OF THE INVENTION

This invention relates to the bending of sheets of thermoplastic material, especially glass. Many techniques for bending glass sheets are known. Perhaps the simplest technique is to heat a glass sheet while supported on a contoured mold and to permit the glass sheet to sag into conformity with the mold. However, it is often desirable to speed the process by applying a mechanical bending force such as by pressing the glass between a pair of contoured molds. A particularly advantageous press bending process is shown in U.S. Pat. No. 3,846,104 to S. L. Seymour wherein a horizontally oriented glass sheet is heated and lifted by a lower bending mold into contact with an upper bending mold where it is retained by vacuum while the lower bending mold retracts. Then a tempering ring receives the bent glass sheet and conveys it from the bending station into a tempering station. That arrangement is especially advantageous in that it provides contoured support for the bent glass sheet during the tempering step and frees the bending station for initiating the next bending cycle while tempering of the first glass sheet is being carried out. A drawback to such an arrangement is that three major components of the apparatus, the upper and lower forming molds and the tempering ring, must all be custom fabricated for each different shape produced on such a bending and tempering line. It would be desirable not only to reduce the cost of fabricating these elements with each shape change, but also to reduce the down time of the bending and tempering line necessitated by the installation of these elements with each product change.

In U.S. Pat. No. 3,713,799 to H. A. McMaster, a similar arrangement is disclosed, but in which the lower shaping mold serves to carry the bent glass sheet into the tempering station, thus delaying the commencement of the next bending cycle until the lower bending ring deposits the glass sheet in the tempering station and returns to the bending station. Likewise, in this arrangement a product change requires a major retooling of the bending station since the upper and lower forming molds as well as the gas support block into which the lower forming mold recesses, all must conform to the shape of the glass sheets being processed. A similar arrangement in U.S. Pat. No. 3,573,889 to H. A. McMaster et al. has the same drawback.

U.S. Pat. Nos. 3,507,639 to S. L. Seymour and 3,676,098 to H. R. Hall both show horizontal press bending arrangements wherein only two elements, the upper and lower bending molds, need to be custom fabricated for each glass shape being produced. It would be desirable to reduce the number of custom made parts even further. Furthermore, in both of these arrangements the edges of the bent glass sheets are not supported as they are conveyed from the bending station into the tempering station.

U.S. Pat. No. 3,476,540 to Ritter et al. discloses a glass bending arrangement whereby the inertia of a single vertically rising lower bending mold effects the bending. Disadvantageously, the bent glass sheets must pass without edge support along a roller conveyor into the tempering zone.

U.S. Pat. No. 3,600,150 to Rougeux shows a glass bending arrangement wherein a heat-softened glass sheet is slipped from a roller conveyor onto a flexible hammock and thereafter press bent between upper and lower forming molds. The purpose of the flexible hammock is to support the glass sheet initially out of contact with the rigid shaping mold surfaces. It is apparent that a major reconstruction of the apparatus would be required when a change in the glass shape is desired.

SUMMARY OF THE INVENTION

In the present invention a single shaping mold conforming to the outline and contour of the bent glass sheet is employed, onto which a heat-softened glass sheet is dropped to impart the bending force to the glass. Immediately after each glass sheet leaves a heating furnace, it is elevated by means of a flat vacuum platen which is brought into contact with the upper side of the glass sheet. When the vacuum platen and the glass sheet are raised to an elevated position, the shaping mold is conveyed into a position beneath the glass sheet, the vacuum is released, and the glass sheet drops onto the shaping mold to effect the bending. The shaping mold is then retracted from beneath the vacuum platen and passed into a tempering station where blasts of air are directed onto the opposite surfaces of the glass sheet to temper the glass. This arrangement greatly simplifies change-over from one shape to another since the single bending mold is the only major element which must be reconstructed. Another important feature of the present invention is that the arrangement may be readily adapted to bending and tempering a plurality of glass sheets simultaneously, thereby greatly increasing the productivity of the installation.

DETAILED DESCRIPTION

Figure 1:
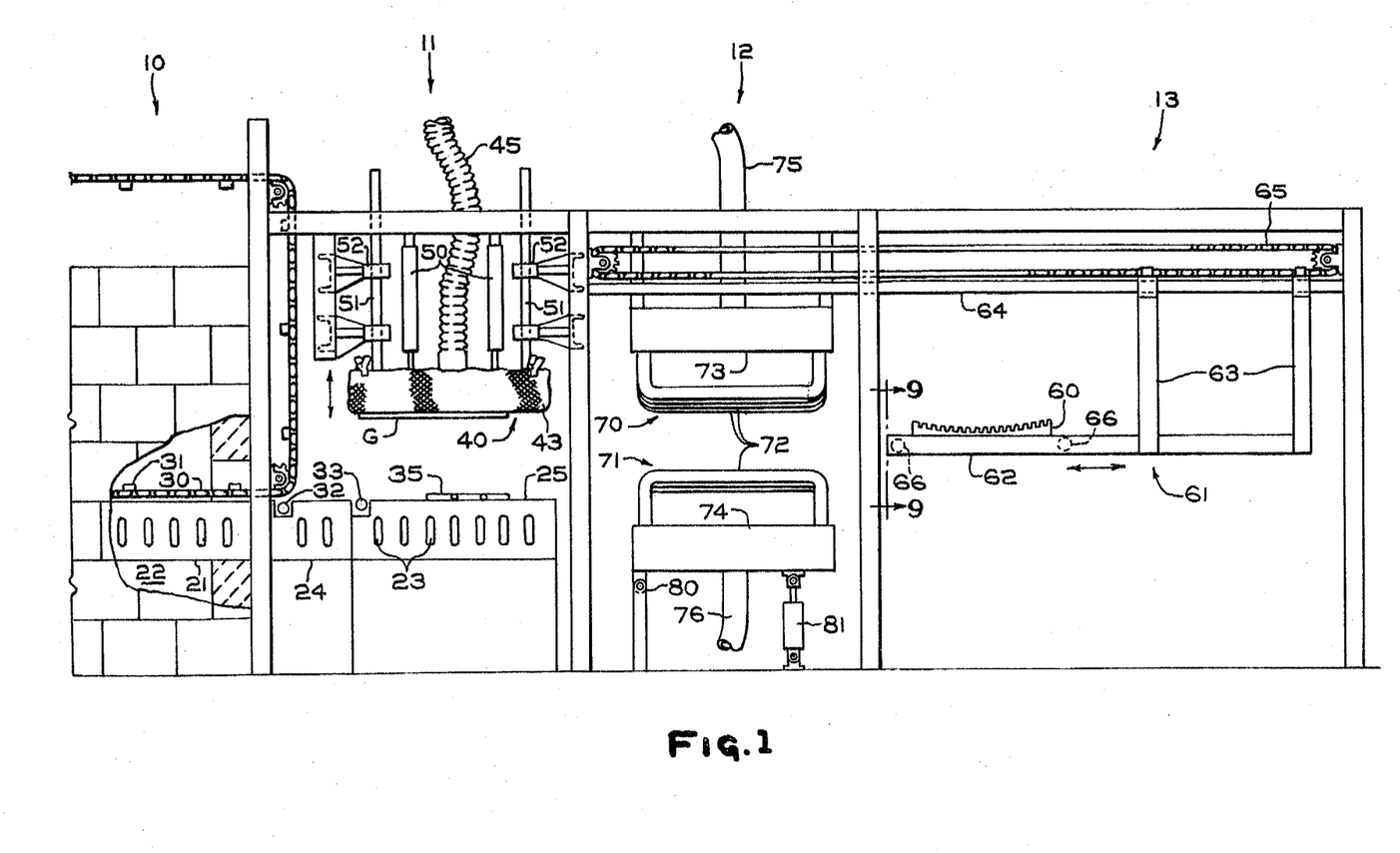
FIG. 1 is a side view of a specific preferred embodiment of a glass sheet bending and tempering installation incorporating the drop forming process and flat vacuum pick-up of the present invention.

In FIG. 1 there is shown a bending and tempering line including a furnace 10 (only exit end of which is shown), a bending station 11, a tempering station 12, and an unloading station 13. The furnace, tempering station, and unloading station form no part of the present invention, and the description of a specific embodiment herein is for the purpose of illustration only. Any arrangement known in the art for heating and tempering a series of horizontally disposed glass sheets may be employed in connection with the bending process of the present invention. Accordingly, only a brief description of the furnace, tempering station and unloading station will be set forth here. Additional details regarding these aspects of the overall bending and tempering line may be obtained from U.S. Pat. No. 3,846,104 (Seymour), the disclosure of which is hereby incorporated by reference.

Furnace 10 is preferably of the gas support type wherein the sheets of glass are supported on a layer of hot gases as they are heated and conveyed through the furnace. Examples of gas support furnaces for heating glass sheets may be found in U.S. Pat. No. 3,223,501 to Fredley et al. and in U.S. Pat. No. 3,332,759 to McMaster et al. In the cut-away portion of the furnace in FIG. 1 it can be seen that the gas support bed is defined by a hearth block 21 through which a large number of vertical bores extend, some of which communicate the upper surface of the hearth block with hot, pressurized gases from a plenum chamber 22 and others of which communicate the top surface of the hearth block with cross-bored exhaust passages 23. The same hearth block construction continues beyond the furnace exit to an extension 24 and a support block 25 in the bending zone. Greater detail of the hearth block construction may be found in the cross-sectional view of support block 25 in FIG. 3. There, it can be seen that vertical bores 26 extend completely through the block and that bores 27 extend from the surface to the horizontally extending exhaust passages 23.

Referring again now to FIG. 1, there is shown one typical arrangement for propelling the glass sheets through the furnace as they are supported on a film of hot gases. The conveying mechanism there comprises a pair of parallel, endless chains 30 flanking the path of the glass sheets inside the furnace and joined by a plurality of pusher bars 31. At the exit of the furnace, each glass sheet may be released from the chain conveying means and driven at an accelerated speed across the extension block 24 and into the bending station by means of a take-out roll 32 and an aligning roll 33. Passage of the glass sheets from the furnace may be aided by providing the hearth blocks 21, 24, and 25 with a slight downward slope (e.g., 1 degree to 2 degrees). Typically, sufficient gas pressure is maintained between the hearth blocks and the glass sheets so as to float the glass sheets about 1/16 inch (1.6 millimeters) above the upper surface of the hearth blocks. Take-out roll 32 and aligning roll 33 project above the upper surface of the hearth blocks just enough to make contact with the undersides of the glass sheets.

Figure 2:
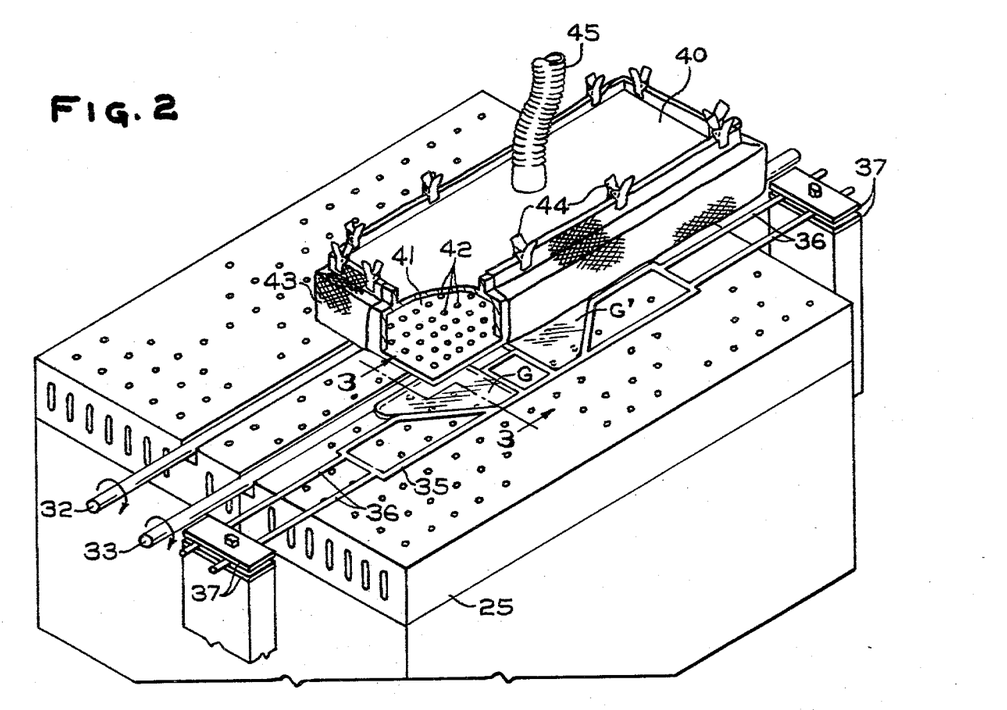
FIG. 2 is a perspective view of the drop forming section of the bending and tempering apparatus of FIG. 1.
Figure 3:
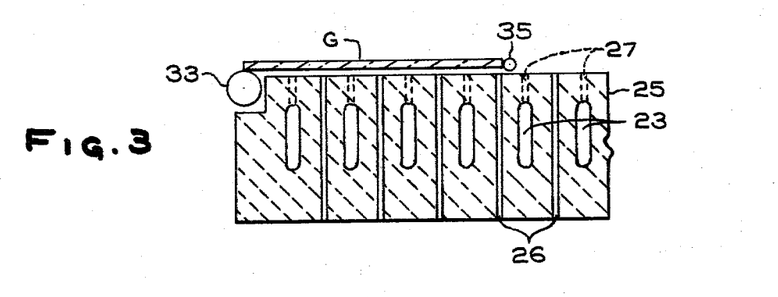
FIG. 3 is a cross-sectional view through the gas support block in the forming zone taken along line 3—3 in FIG. 2.

When a glass sheet has arrived in the bending station, its forward progress is stopped by a locator frame 35 resting on hearth block 25. The locator frame defines at least one open-ended "pocket" within which the forward portion of a glass sheet may be received. As shown in FIG. 2, the locator frame 35 inclues two such pockets for receiving glass sheets G and G'. Each of the glass sheet receiving pockets is contoured to correspond approximately to the outline of the leading portion of each glass sheet so that the glass sheet, when urged into engagement with the locator frame, will become seated firmly within the pocket with little or no freedom of movement. The locator frame 35 is spaced from aligning roll 33 a precisely determined distance so that the trailing edge of a properly aligned glass sheet is approximately directly over the center of the aligning roll 33 as shown in FIG. 3. The aligning roll 33 continues rotating so as to urge the glass sheet into the pocket of the aligning frame as the glass sheet floats on the layer of hot gases. The frictional force between the aligning roll 33 and the glass sheet is minimized and restricted to the trailing edge of the glass sheet in order to avoid scuffing the glass, but is sufficient to drive the floating glass sheet into an equilibrium position in alignment with the pocket of the locator frame and to retain the glass sheet therein. Such an aligning arrangement readily lends itself to processing a plurality of glass sheets side by side. For example, the locator frame in FIG. 2 is constructed to receive two glass sheets and in FIG. 10 a locator frame is shown for receiving four glass sheets. It should be apparent that a locator frame could be adapted to accommodate any number of glass sheets which will fit side-by-side on the hearth block 25. The locator frame 35 may be held in place by means of rods 36 which, as shown in FIG. 2, may extend laterally toward support means on each side of the hearth block 25. The rods 36 are preferably supported at their ends with some provision for adjustability, such as by clamping between a pair of plates 37 as shown. Other arrangements for mounting the locator frame will be described later in connection with FIGS. 10 and 11. The locator frame arrangement itself is the subject matter of copending patent application Ser. No. 960,403 filed on Nov. 13, 1978, by S. L. Seymour and entitled "Glass Sheet Alignment Means and Method," the disclosure of which is incorporated by reference.

While the use of a locator frame and an aligning roll as described above is the preferred arrangement for repetitively establishing a precisely predetermined location for each glass sheet as it enters the bending station, other arrangements may serve the same purpose. For example, the use of vertically retractable pins as shown in U.S. Pat. Nos. 3,573,889 and 3,676,098 may be resorted to. It may also be noted that in the event that a roller conveyor were to be used instead of a gas support bed, the need to precisely align the glass sheets within the bending station may be less critical. This is because glass sheets are more prone to drift out of alignment when floating freely on gas support. When a roller conveyor is used to convey the glass sheets into the bending station, final orientation of the glass sheets may be carried upstream from the bending station as shown in U.S. Pat. No. 3,701,643 to R. G. Frank, for example.

Directly overlying the locator frame 35 is vacuum platen 40. The vacuum platen is comprised of a hollow chamber having a flat bottom plate 41 through which a large number of perforations 42 extend. In order to protect the surface of the hot glass sheets, the underside of the vacuum platen may be covered with a protective cover 43, which may be a stretchable knit fiber glass fabric as disclosed in U.S. Pat. No. 3,148,968 to J. H. Cypher et al. The cover 43 may be held in place by a plurality of clamps 44. The hollow interior of the vacuum platen communicates with a source of vacuum by means of a flexible conduit 45. The area of the vacuum platen should exceed the total area of the largest glass sheet or sheets to be received at one time in the locator frame 35. For the greatest versatility the vacuum platen may cover substantially the entire area of hearth block 25.

The flatness and rigidity of the bottom plate 41 of the vacuum platen are important factors for the successful practice of the present invention. Any significant deviation from flatness can result in distortion being imparted to the glass sheets. Thus, the bottom plate 41 should be fabricated with careful attention to providing a flat bottom surface and should be sufficiently rigid to avoid any bending or warping during use. Preferably, the bottom plate is a relatively thick, single piece of heat-resistant metal, such as stainless steel, although in some cases it may be possible to use thinner stock material with reinforcement members welded to the interior surface. As an example of the preferred one-piece construction, a stainless steel thickness of at least one-half inch (13 millimeters), preferably at least $\frac{5}{8}$ inch (16 millimeters), has been found suitable for a plate 32 inches by 78 inches (81 centimeters by 2 meters). In that example, the interior of the vacuum platen was 3 inches (7.5 centimeters) tall.

The vacuum platen is provided with means for vertical reciprocation, such as hydraulic cylinders 50 and guide rods 51, as shown in FIG. 1. The guide rods 51 may slide in fixed, annular sleeves 52. The cylinders 50 reciprocate the vacuum platen between a raised position, as shown in FIG. 1, and a lowered position in which the platen is brought closely adjacent to, or in contact with, the locator frame 35 and the glass sheet or sheets held by the locator frame. When the vacuum platen is in the lowered position, sufficient vacuum is applied to draw the glass sheets into contact with the platen and to be lifted by the vacuum platen as the vacuum platen is raised. The platen need not come into contact with the glass sheets in order to pick them up. Merely approaching within 1/32 inch (0.8 millimeter) to about 1/16 inch (1.6 millimeters) has been found sufficient to lift the glass sheets, although this may vary depending upon the amount of vacuum applied and the weight of the glass. Additionally, the amount of vacuum required, the number of perforations 42 in the vacuum platen, and the diameter of the perforations are interdependent. It is desirable to keep the perforations 42 small in number and diameter so as to minimize the power requirement for maintaining a vacuum in the vacuum platen, but there should be enough perforations so that a relatively uniform distribution of the perforations will overlie each portion of the smallest piece of glass to be processed. A spacing of about one perforation per square inch (6.5 square centimeters) has been found to be suitable for most purposes. Perforation diameters larger than 0.075 inch (1.9 millimeters), for example about 0.090 inch (2.3 millimeters), have been found satisfactory with a vacuum of 4 inches (10 centimeters) water (gauge). These data pertain to the processing of 3 millimeter thick sheets of soda-lime-silica float glass of standard commercial composition.

Figure 9:
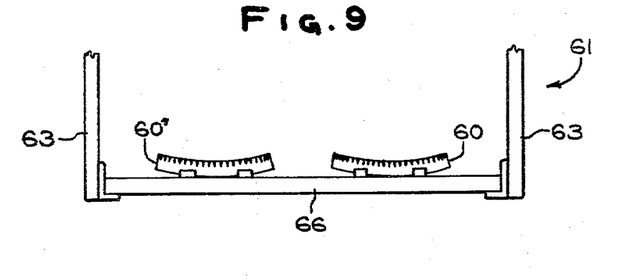
FIG. 9 is an end view of the bending mold and support structure taken along line 9—9 in FIG. 1.

With the glass sheet or sheets drawn against its underside by vacuum, the platen 40 is raised to the elevated position as shown in FIG. 1 so as to leave sufficient clearance to insert an outline shaping mold 60 between the hearth block 25 and the platen. The shaping mold conforms to the outline and contour desired for the bent glass sheets and is preferably constructed in accordance with the disclosure of U.S. Pat. No. 3,973,943 to S. L. Seymour, the disclosure of which is hereby incorporated by reference. The shaping mold is preferably of the outline ring type, light in weight and notched along its upper edge in order to provide minimal interference with the flow of air during tempering. The shaping mold is carried on a shuttle 61 by which the shaping mold is translated horizontally through the bending, tempering and unloading zones. In the specific embodiment illustrated, the shuttle consists of a pair of cantilevered beams 62 supported at one end by vertical braces 63, the upper ends of which are adapted to slide along a pair of horizontal guide rods 64. The means for driving the shuttle 61 along the horizontal path may be provided by way of an electric motor (not shown) driving a continuous chain 65 to which the upper ends of braces 63 are affixed. Cross-braces 66 may support the shaping mold or molds on the shuttle. An end view of the shuttle may be seen in FIG. 9, wherein two shaping molds 60 and 60' are included for simultaneously receiving sheets G and G' in FIG. 2.

When the vacuum platen 40 has been raised to a height above the elevation of the shaping mold 60, the shuttle is driven to the left as viewed in FIG. 1 so as to bring the bending mold into direct alignment beneath the sheet of glass elevated on the vacuum platen. Typically, the distance between the vacuum platen and the hearth block 25 at this point may be about 6 to 8 inches (15 to 20 centimeters). This distance will have an effect on the rate at which the glass sheet loses heat, since a higher elevation raises the glass sheet into a cooler environment. This effect may be used to "fine tune" the temperature (and thus the viscosity) at the moment the glass sheet is dropped onto the shaping mold. The uppermost extent of the shaping mold when in position directly beneath the glass sheet is spaced from the glass sheet a distance greater than the minimum required to clear the glass sheet, so that when the glass sheet is released from the vacuum platen it will fall a distance onto the shaping mold sufficient to generate a substantial bending force on the glass upon impact. In the typical case where the contour of the shaping mold includes points of maximum elevation, the falling glass sheet first contacts these high points, and a bending moment about these points is generated which forces the remainder of the glass sheet to bend downwardly until substantially complete contact is made with the shaping mold. A suitable distance between the vacuum platen and the high points of the shaping mold has been found to be about 1 to 2 inches (2.5 to 5 centimeters), and about 2 to 6 inches (5 to 15 centimeters) at the low points of the mold. The precise distance through which the glass falls will depend upon the weight and temperature of the glass, the degree of curvature to be imparted to the glass, and the geometry of the particular shape, and in unusual cases may vary beyond the distance ranges given above.

Release of the glass sheet from the vacuum platen is carried out by reducing the vacuum to an amount insufficient to support the glass sheet. This may be accomplished conveniently by opening a valve to bring the interior of the vacuum platen into communication with atmospheric pressure. Or in some cases, it may be desirable to expedite the release of the glass from the platen by following a rapid decay of the vacuum with a rapid buildup to a positive pressure. Another optional feature is to provide the vacuum platen with a plurality of separately controllable vacuum zones so that the vacuum may be released nonuniformly. For example, it may be beneficial in some cases to release the edge portions and the center portion of a glass sheet at different times. By delaying the release of the center portions a slight reverse bend may be imparted to the glass, which may be helpful in avoiding excessive center sag when the glass sheet is dropped onto a concavely contoured outline shaping mold. Conversely, differential vacuum release may be utilized to accentuate a relatively deep bend which may be otherwise difficult to attain by impact force alone.

The momentum imparted to the glass sheet by its free fall onto the shaping mold preferably provides essentially the sole bending force for conforming the glass sheet to the contour of the shaping mold. Although some minor amount of sagging due to the force of gravity may take place after the glass sheet has come to rest on the shaping mold, its magnitude is insignificant relative to the bending produced by the momentum-generated force in the preferred mode of operation. Sagging is a relatively slow process, and in the present invention, tempering is preferably initiated in the minimum amount of time, thereby providing insufficient time for a significant amount of gravity-induced sagging to take place. On the other hand, for some difficult bends it may be desirable to delay the start of tempering so as to permit a significant amount of additional sagging to take place after the glass sheet has dropped onto the mold. Although slower than the preferred mode, such a technique would be considerably faster than gravity sagging alone since the initial dropping of the glass onto the mold would accomplish a substantial part of the bending very quickly.

Upon receiving the glass sheet, the shaping mold is immediately transferred out of the bending station into the tempering station 12. The tempering station includes upper and lower blast heads 70 and 71 which direct blasts of tempering medium (usually air) onto opposite sides of the glass sheet so as to rapidly cool surface portions of each glass sheet, thereby imparting a temper to the glass sheet. In the type of tempering station shown in FIG. 1, each blast head includes a plurality of pipe modules 72 in fluid communication at their ends with a manifold 73 or 74. Each manifold, in turn, is supplied with pressurized tempering fluid through ducts 75 and 76. Each of the pipe modules 72 has a plurality of small orifices oriented so as to direct jets of tempering fluid toward the position occupied by glass sheets conveyed into the space between the upper and lower blast heads 70 and 71. The pipe modules 72 may be provided with adjustability in the vertical direction with respect to the manifolds 73 and 74 so that more uniform spacing between the glass surfaces and the pipe modules may be provided. The lower blast head 71 may be provided with hinged support 81 at one end and cylinder means 81 at the opposite end so as to permit the lower quench module to be tilted when the need arises to clear glass fragments from the blast head. While blasts of tempering medium are being directed onto the glass sheets in the tempering station, it is preferred to provide relative motion between the blast heads and the glass sheets. This may be carried out by horizontally reciprocating the shuttle means 61 on which the shaping mold and glass sheets are carried.

When tempering has been completed, the shuttle means 61 advances to the full right-hand position as shown in FIG. 1 to bring the glass sheet or sheets into the unloading station 13. There, the glass sheets may be removed from the shaping mold by hand or by suitable mechanical means.

Figure 4:
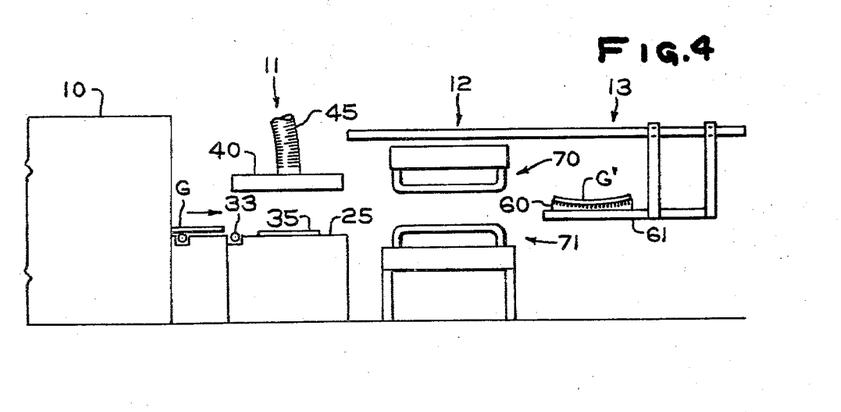
FIGS. 4 through 8 illustrate sequential steps in a cycle of operation of the apparatus of FIG. 1.
Figure 5:
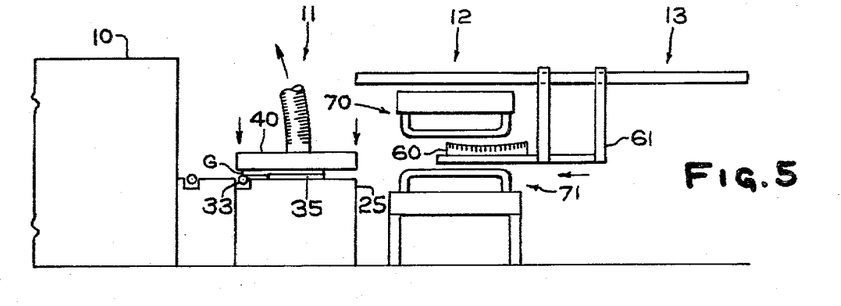
Figure 6:
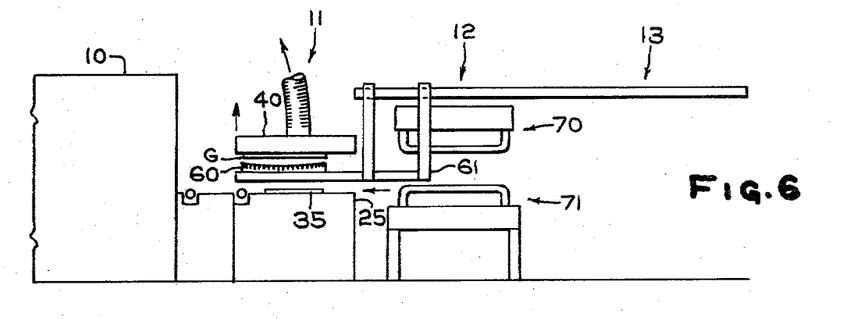
Figure 7:
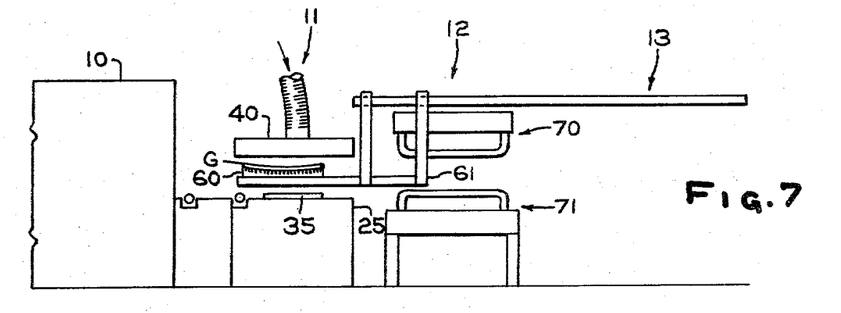
Figure 8:
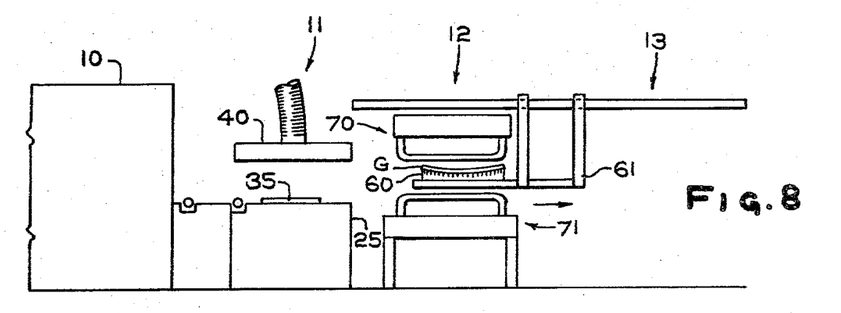

FIGS. 4 through 8 illustrate one cycle of operation in the method of bending glass sheets in accordance with the present invention. In FIG. 4, a sheet of glass G is emerging from the furnace 10. At the same time, an already bent and tempered sheet of glass G' is about to be unloaded from the shuttle 61. In FIG. 5, the sheet of glass G has entered the bending station 11 and its front end has engaged the locator frame 35 while being driven at its trailing edge by aligning roll 33. At the same time, vacuum platen 40 is being lowered to engage the glass sheet. The previous glass sheet has been unloaded from the shuttle 61 and the shuttle has begun to move toward the bending zone. In FIG. 6, the sheet of glass has been lifted from the gas support bed 25 by the vacuum platen 40 and shuttle 61 has come to rest, with the shaping mold 60 directly beneath the glass sheet. In FIG. 7, the vacuum has been released from the vacuum platen and the sheet of glass has fallen onto the shaping mold 60 and has thereby become bent to the desired curvature. The shuttle immediately carries the glass sheet out of the bending station and into the tempering station 12 where it is rapidly cooled by blasts of air as shown in FIG. 8. Thereafter, the shuttle carries the glass sheet into the unloading station 13.

The following operating parameters are an example of a successful operation of the above-described preferred embodiment of the invention with glass sheets 3 millimeters thick. Under different conditions the data will vary. The furnace atmosphere was maintained at a temperature of about 1300° F. (700° C.). The gas issuing from the hearth block 25 in the bending zone may be about 1100° to 1350° F. (600° C. to 725° C.), typically about 1250° F. (675° C.). The vacuum platen 40 attained a temperature of about 500° to 750° F. (260° to 400° C.) after a period of operation due to its proximity to the hot gases from hearth block 25. The glass was typically at about 1210° F. (650° C.) when picked up by the vacuum platen. A total of about 6 seconds elapsed from the time of glass pick-up until the initiation of tempering, at which time the glass had cooled to about 1190° F. (640° C.). About 3 seconds elapsed from the time the glass was dropped onto the shaping mold until tempering was initiated. Altogether about 10 seconds was required for the glass to pass from the furnace exit, undergo bending, and enter the tempering station. These rapid bending rates not only indicate a high rate of throughput, but are also advantageous for the sake of attaining high degrees of temper since the rapidity of the bending process permits tempering to begin before the glass sheets have lost an appreciable amount of heat.

Figure 10:
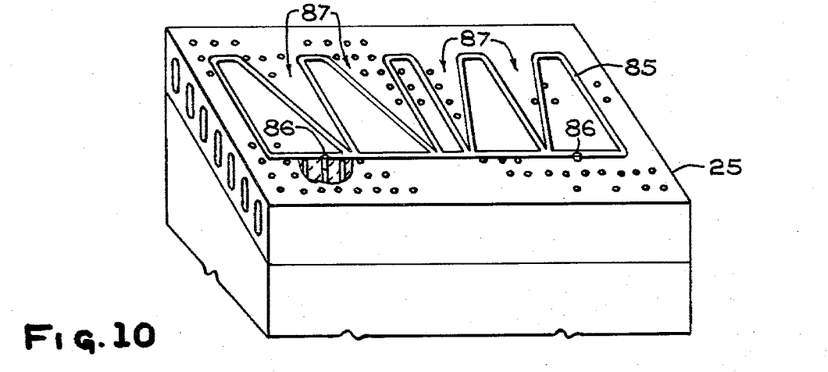
FIG. 10 is a perspective view of the gas support bed in the shaping station showing a quadruple aligning frame and an alternate mounting arrangement for the aligning frame.

FIG. 10 shows an alternate arrangement for mounting a locator frame onto the hearth block 25 in the bending station. In order to illustrate the versatility of the locator frame arrangement, a locator frame 85 is depicted in FIG. 10 which is provided with four pickets 87 permitting the simultaneous alignment and bending of four sheets of glass. For retaining the locator frame in place, two or more pins 86 are welded to the front edge of the locator frame and may be inserted into holes bored into the hearth block 25. The holes may be those already present in the hearth block for the passage of gases, or special holes may be drilled for the purpose of receiving the pins 86.

Figure 11:
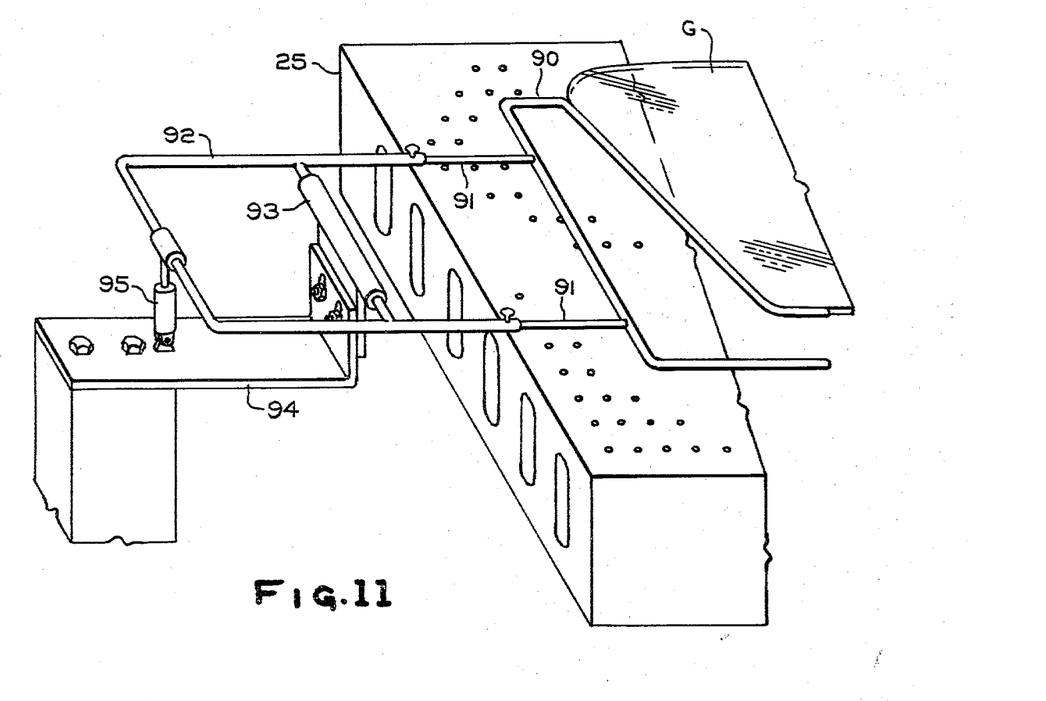
FIG. 11 is a perspective view of another alternate mounting arrangement for the aligning frame in the shaping station.

FIG. 11 depicts yet another variation on the mounting arrangement for the locator frame. In this case, the locator frame is provided with pivoting support so that the locator frame may be readily raised above the surface of the hearth block 25 if it should become necessary to remove glass fragments from the hearth block. A pair of rods 91 telescope into the ends of a tubular hinge bracket 92 for lateral adjustability. The hinge bracket 92 pivots through a sleeve 93 which is affixed with vertical adjustability to a support arm 94. The outer end of hinge bracket 92 may be engaged by mechanical actuating means such as a hydraulic cylinder 95 so as to provide remote control of the locator frame lifting mechanism. In the embodiment of FIG. 11, it is preferred that the locator frame consist of two halves, with each half being lifted by its own respective hinge means.

Figure 12:
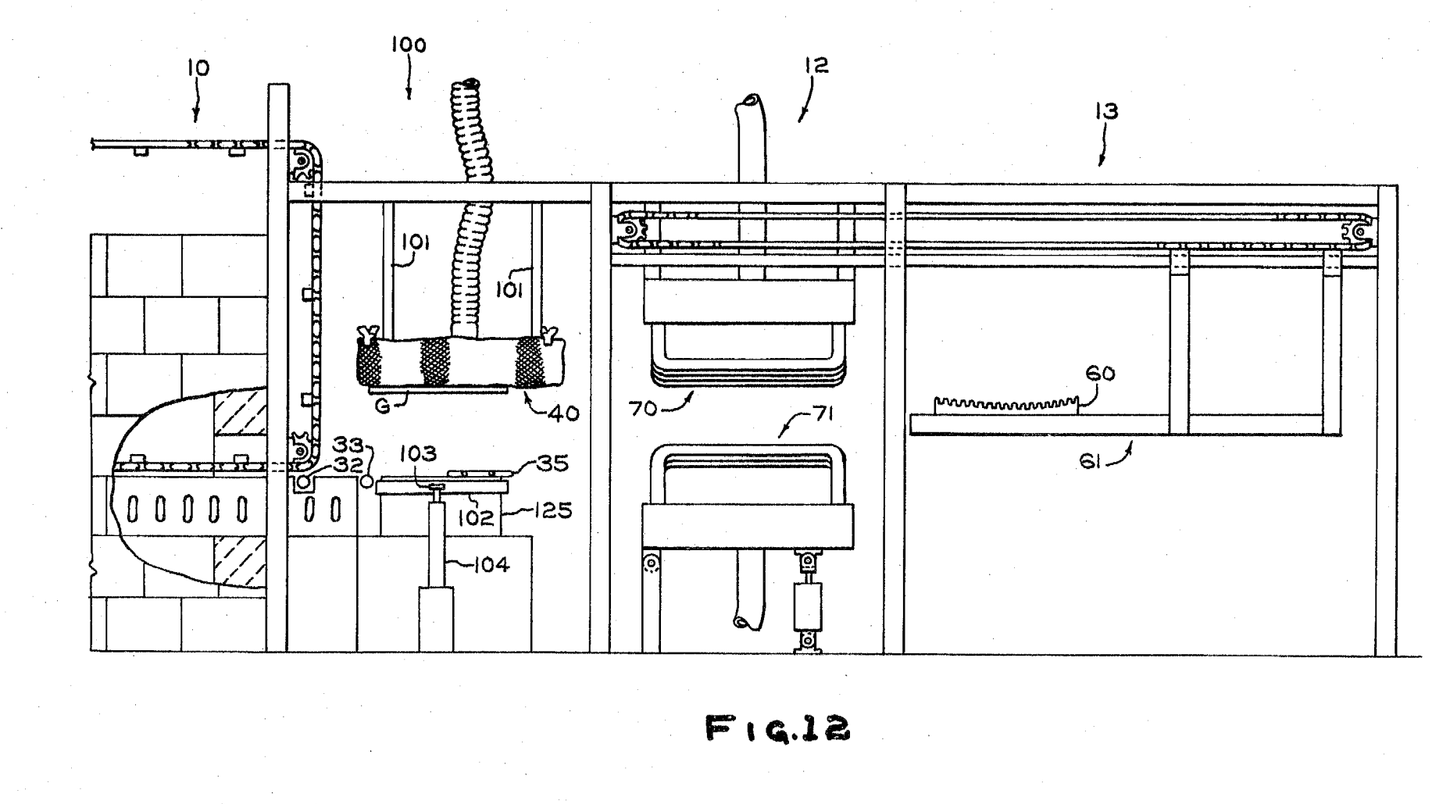
FIG. 12 is a side view of an alternate embodiment for drop forming glass sheets using a flat lifting ring.

FIG. 12 shows an alternate arrangement which incorporates some, but not all, of the features and advantages of the preferred embodiment of the present invention. In FIG. 12, like numerals refer to elements which may be identical to those which have been described in connection with the preferred embodiment of FIG. 1. In particular, the furnace 10, tempering station 12, and unloading station 13 are identical to those of FIG. 1 and need not be described here. However, in the bending station 100 in FIG. 12, the vacuum platen 40 is not vertically reciprocated but is rigidly suspended by beams 101. Like the preferred embodiment, the vacuum platen is flat and need not be modified when changing glass shapes. But instead of being picked up by the vacuum platen, the glass sheets in this embodiment are lifted into contact with the underside of the vacuum platen by a lifting ring 102. Lifting ring 102 is vertically reciprocated by means of a hydraulic cylinder 104 which is connected to the ring by means of a laterally extending tab 103. The ring 102 may fit around a gas support hearth block 125 which may be of essentially the same construction as that of previously described hearth block 25, but of reduced size. Alternatively, the ring 102 may fit into grooves cut into the top of a larger size hearth block. The upper side of the lifting ring defines a flat plane of support for a glass sheet along either a continuous or discontinuous line of contact with marginal edge portions of a glass sheet. Glass sheets are aligned on hearth block 125 by a locator frame 35 and aligning roll 33 in the same manner as previously described. After each glass sheet is lifted by the ring 102 and retained on the underside of the vacuum platen 40, the ring is retracted to its lower position, a shaping mold 60 is brought into alignment beneath each glass sheet, and the glass sheet is dropped onto the shaping mold to impart the desired curvature to the glass sheet. This arrangement is advantageous relative to prior art vacuum assisted bending arrangements in that the vacuum platen is flat and need not be reconstructed when a product change is made, and in that it can be readily adapted to the simultaneous processing of a plurality of glass sheets. However, the FIG. 12 arrangement is not as advantageous as that of the preferred embodiment because the hearth block 125 and the lifting ring 102 must be replaced for each change in the shape or number of glass sheets to be processed.

Other variations on the FIG. 1 embodiment which are contemplated by the present invention may involve the use of a roller conveyor instead of the gas support means for supporting and conveying the glass sheets. A roller conveyor may be used in place of all of the gas support bed sections in the furnace and bending station, or it may be advantageous to substitute a roller conveyor for the gas support bed in the furnace only and to utilize a gas support hearth block such as 25 in the bending station.

It should also be apparent that the step of aligning the shaping mold with the glass sheet prior to dropping the glass sheet may optionally entail translating the platen rather than the shaping mold.

Another alternative within the scope of the invention is to heat the glass sheets as they are being supported in a generally vertical orientation. For example, the glass sheets may be conveyed through a furnace while resting on their lower edges and being held upright by currents of heated gases, as disclosed in U.S. Pat. No. 3,341,312 to R. W. Wheeler. The vacuum platen may swivel to receive each glass sheet in a vertical orientation and then rotate to a horizontal orientation for dropping the glass sheet onto a shaping mold.

Descriptions of specific embodiments have been set forth herein for the sake of illustrating the best mode and other illustrative examples for practicing applicant's invention, but it should be understood that other variations and modifications as are known to those of skill in the art may be resorted to without departing from the spirit and scope of the invention as set forth in the claims which follow.

I claim

1. A method of shaping glass sheets, comprising the steps of:
heating a glass sheet to approximately its softening point and bringing the glass sheet to rest on support means;
translating a vacuum platen having a flat, perforated surface toward the support means to bring the flat, perforated surface into close proximity to, and parallel with, a surface of the glass sheet;
drawing vacuum through the flat, perforated surface so as to retain the glass sheet on the platen;
translating the platen away from the support means to lift the glass sheet from the support means and to bring the glass sheet into a generally horizontal orientation on the underside of the platen;
bringing into vertical alignment with and beneath the glass sheet held on the platen a shaping mold having a contour defining the desired contour for the glass sheet; and
releasing the glass sheet from the platen so as to fall onto the shaping mold and conform to the contour defined by the shaping mold.

2. The method of claim 1 wherein said step of bringing the heat-softened glass sheet to rest comprises supporting the glass sheet on a layer of hot gases.

3. The method of claim 2 wherein the glass sheet is additionally supported during the heating step on a layer of hot gases.

4. The method of claim 1 or 2 wherein a plurality of glass sheets are simultaneously retained on the platen and released therefrom to fall onto a corresponding plurality of shaping molds.

5. The method of claim 1 wherein the glass sheet is released from the platen from a sufficient height above the shaping mold so that the force of impact constitutes substantially the entire bending force required to attain the desired shape for the glass sheet.

6. The method of claim 1 wherein the release of the glass sheet from the platen is from a height sufficient to generate a force of impact which constitutes a substantial portion of the bending force required to shape the glass sheet, and thereafter retaining the glass sheet on the shaping mold to permit additional bending of the glass sheet to take place by sagging under the influence of gravity.

7. The method of claim 5 or 6 wherein the height above the shaping mold from which the glass sheet is released is at least 5 centimeters in at least portions of the glass sheet.

8. The method of claim 1 wherein after the glass sheet has fallen onto the shaping mold, the shaping mold carries the glass sheet out from under the platen into a tempering station where the glass sheet is rapidly cooled by blasts of tempering fluid so as to temper the glass.

9. The method of claim 1 wherein the glass sheet is brought to rest in a generally horizontal orientation beneath the vacuum platen, the vacuum platen reciprocates in a vertical direction to engage and lift the glass sheet, and the shaping mold is brought into alignment beneath the glass sheet by shuttling the shaping mold along a horizontal path.

10. The method of claim 1 wherein release of the glass sheet from the platen is effected by rapid release of the vacuum in the platen to a level insufficient to support the glass sheet.

11. The method of claim 1 wherein the glass sheet, as it falls onto the shaping mold, first comes into contact with portions of the shaping mold at the highest elevation, and the glass sheet is then forced to bend toward portions of the shaping mold at lower elevations by momentum generated by the fall.

12. The method of claim 8 or 11 wherein the shaping mold onto which the glass sheet is dropped is a ring conforming to the outline of the glass sheet.

13. An apparatus for shaping glass sheets comprising;
furnace means for heating glass sheets to a softened condition;
support means adjacent to the furnace means for supporting glass sheets;
conveyor means for transferring glass sheets from the furnace means to the support means;
a platen having a flat perforated plate and having an enclosed interior space in communication with a source of vacuum;
means for transferring the platen into and out of close proximity to the support means so as to lift the glass sheet from the support means by means of vacuum;
a shaping mold having outwardly facing shaping surfaces defining the desired curvature and corresponding to the shape of the glass sheets; and
shuttle means for alternately bringing the platen and the shaping mold into and out of superimposed vertically spaced relationship to each other, wherein the shaping mold in the superimposed position is supported at an elevation below the platen so as to receive and shape a glass sheet dropped from the platen.

14. The apparatus of claim 13 wherein said support means comprises a perforated bed adapted to support glass sheets on a layer of hot gases.

15. The apparatus of claim 14 wherein the furnace includes means for supporting glass sheets on a layer of hot gases as they are being heated.

16. The apparatus of claim 15 wherein said conveyor means includes at least one roll extending transversely across the path of glass sheet travel near the exit of the furnace supported at an elevation to contact the undersides of glass sheets leaving the furnace and associated with drive means for rotating the roll and driving the glass sheets onto said support means.

17. The apparatus of claim 13 further including elevator means for vertically reciprocating the platen into and out of close proximity to the support means.

18. The apparatus of claim 17 wherein the shuttle means is provided with drive means to horizontally reciprocate the shaping mold into and out of said vertically spaced relationship to the platen.

19. The apparatus of claim 13 wherein said furance means, support means and conveyor means are provided with means to support and convey a plurality of side-by-side glass sheets spaced apart in the direction transverse to the direction of glass travel, the platen is provided with sufficient width to engage and lift said plurality of side-by-side glass sheets simultaneously, and a corresponding plurality of shaping molds is provided to receive the plurality of glass sheets from the platen simultaneously.

20. The apparatus of claim 13 further including means to apply blasts of tempering fluid onto a glass sheet resting on the shaping mold.

21. The apparatus of claim 13 wherein said shuttle means is adapted to bring the platen and at least portions of the shaping mold when in the superimposed position into a vertical spacing of at least 5 centimeters.

22. The apparatus of claim 13 or 14 further including in association with said support means, aligning means for engaging glass sheets entering upon the support means and for bringing the glass sheets to rest in a predetermined position upon the support means.

23. The apparatus of claim 22 wherein said aligning means comprises a horizontally extending, rigidly supported frame on said support means, said frame presenting an elongated line of abutment to forward edge portions of a glass sheet entering upon the support means, the line of abutment being contoured to conform to the outlines of the forward edge portions of the glass sheets and a driven roll spaced from a line of abutment a distance approximately equal to the length of the glass sheet and mounted at an elevation and orientation so as to contact rear edge portions of the glass sheet and force the glass sheet into contact with the line of abutment.

24. The apparatus of claim 23 wherein said frame includes a plurality of lines of abutment arranged side-by-side so as to receive and align a plurality of glass sheets simultaneously.

25. The apparatus of claim 13 wherein the shaping mold comprises an open ring corresponding to the outline of the glass sheet.

* * * * *

Disclaimer 4,233,049.—*Samuel L. Seymour*, Oakmont, Pa. METHOD AND APPARATUS FOR SHAPING GLASS SHEETS BY DROP FORMING. Patent dated Nov. 11, 1980. Disclaimer filed July 11, 1983, by the assignee, *PPG Industries, Inc.*

Hereby enters this disclaimer to claims 1, 8, 9, 10, 11, and 12 of said patent.
[*Official Gazette August 30, 1983.*]